(12) United States Patent
Han et al.

(10) Patent No.: US 10,434,499 B2
(45) Date of Patent: Oct. 8, 2019

(54) CATALYST COMPOSITION FOR INHIBITING DIESEL ENGINE WHITE SMOKE EMISSION

(71) Applicant: HEESUNG CATALYSTS CORPORATION, Gyeonggi-do (KR)

(72) Inventors: Hyun-sik Han, Seoul (KR); Eun-seok Kim, Gyeonggi-do (KR); Jae-Uk Han, Gyeonggi-do (KR); Hyoung-Mun Cho, Gyeonggi-do (KR)

(73) Assignee: HEESUNG CATALYSTS CORPORATION, Gyeonggi-do (KR)

( * ) Notice: Subject to any disclaimer, the term of this patent is extended or adjusted under 35 U.S.C. 154(b) by 0 days.

(21) Appl. No.: 15/780,736

(22) PCT Filed: Oct. 31, 2016

(86) PCT No.: PCT/KR2016/012354
§ 371 (c)(1),
(2) Date: Jun. 1, 2018

(87) PCT Pub. No.: WO2017/095023
PCT Pub. Date: Jun. 8, 2017

(65) Prior Publication Data
US 2018/0361359 A1   Dec. 20, 2018

(30) Foreign Application Priority Data

Dec. 3, 2015 (KR) .................. 10-2015-0171098

(51) Int. Cl.
| | | |
|---|---|---|
| *B01J 23/40* | (2006.01) |
| *B01J 23/34* | (2006.01) |
| *F01N 3/035* | (2006.01) |
| *F01N 3/10* | (2006.01) |
| *F01N 13/00* | (2010.01) |

(52) U.S. Cl.
CPC ............ *B01J 23/40* (2013.01); *B01J 23/34* (2013.01); *F01N 3/035* (2013.01); *F01N 3/106* (2013.01); *F01N 13/009* (2014.06); *B01J 2523/18* (2013.01); *B01J 2523/31* (2013.01); *B01J 2523/72* (2013.01); *B01J 2523/824* (2013.01); *B01J 2523/828* (2013.01); *B01J 2523/842* (2013.01); *F01N 2510/06* (2013.01); *F01N 2510/063* (2013.01); *F01N 2570/04* (2013.01)

(58) Field of Classification Search
CPC ... F01N 3/035; F01N 3/10; B01J 23/34; B01J 2523/18
USPC ......................................... 422/168, 177, 180
See application file for complete search history.

(56) References Cited

U.S. PATENT DOCUMENTS

| | | | |
|---|---|---|---|
| 6,685,899 B1 | 2/2004 | Park | |
| 2014/0170044 A1* | 6/2014 | Hoke | B01D 53/945 423/213.5 |
| 2018/0045097 A1* | 2/2018 | Tang | B01D 53/9418 |

FOREIGN PATENT DOCUMENTS

| | | |
|---|---|---|
| KP | 10-2013-0067392 A | 6/2013 |
| KR | 10-2001-0017318 A | 3/2001 |
| KR | 10-2001-0037201 A | 5/2001 |
| KR | 10-0946543 B1 | 3/2010 |
| KR | 20150171098 | 12/2015 |
| WO | WO-2006/044764 A1 | 4/2006 |
| WO | WO-2014/178635 A1 | 11/2014 |
| WO | PCT/KR2016/012354 | 10/2016 |

OTHER PUBLICATIONS

International Search Report dated Feb. 14, 2017 by the International Searching Authority for Patent Application No. PCT/KR2016/012354, which was filed on Oct. 13, 2016 and published as WO 2017/095023 on Jun. 8, 2017 (Inventor—Han et al.; Applicant—Heesung Catalysts Corp.) (Original—3 pages; Translation—2 pages).

* cited by examiner

*Primary Examiner* — Tom P Duong
(74) *Attorney, Agent, or Firm* — Ballard Spahr LLP

(57) ABSTRACT

The present invention relates to diesel oxidation catalyst (DOC) and diesel particulate filter (DPF) catalyst compositions, used for a smoke reduction apparatus, for inhibiting white smoke generated from a diesel engine and, more specifically, to a DOC, enabling minimization of sulphate adsorption, a DPF catalyst, enabling a sulphate desorption delay, and a smoke reduction apparatus having the DOC and DPF catalyst assembled therein. The diesel particulate filter catalyst composition, which is applied to the DPF, comprises oxide components selected from oxide components comprising manganese oxide and silver oxide.

4 Claims, 3 Drawing Sheets

[FIG. 1]
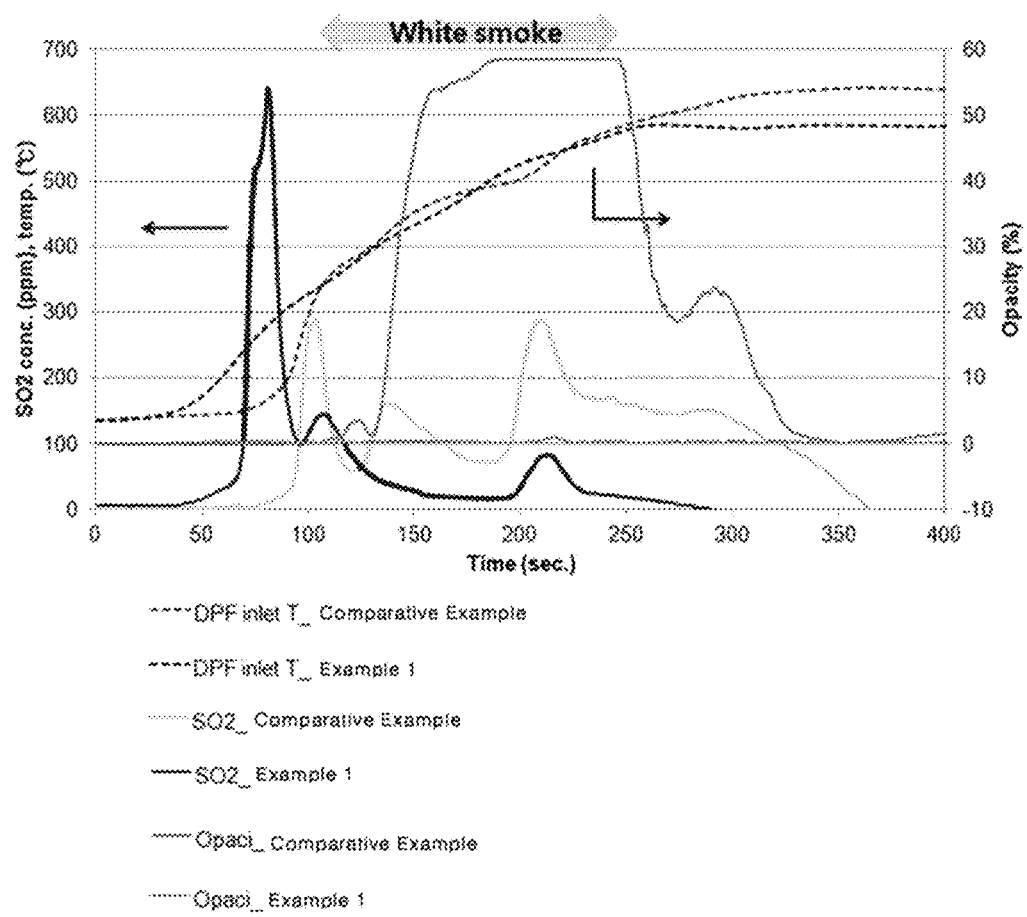

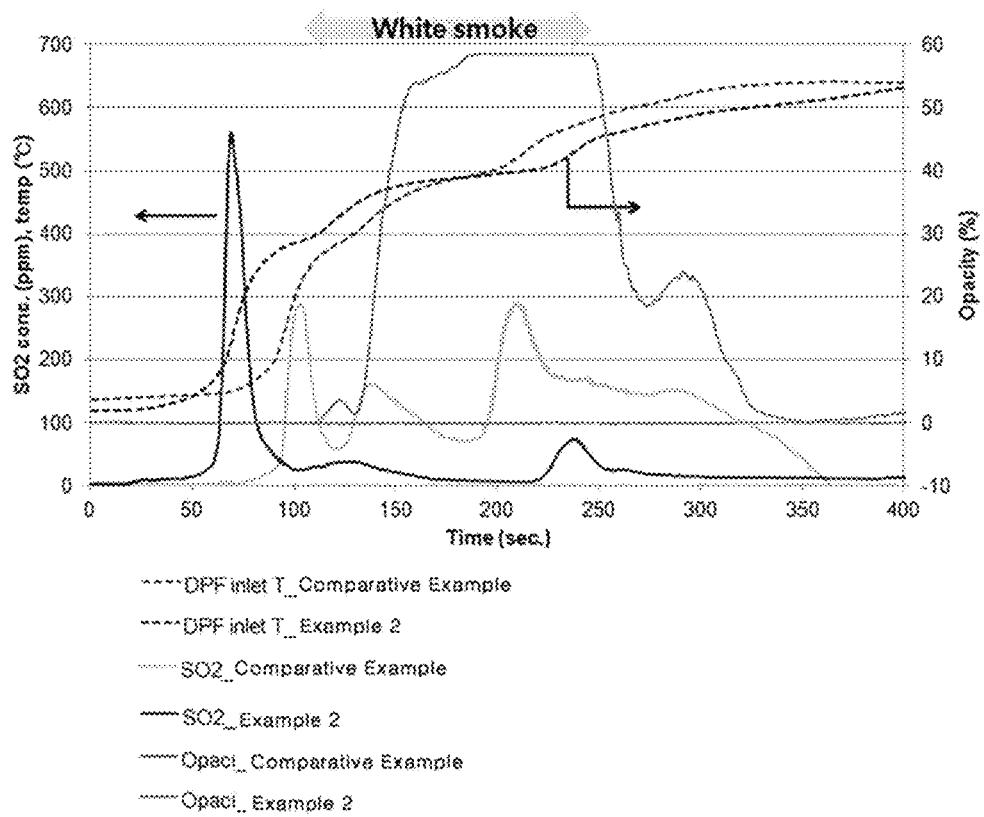

[FIG. 3]
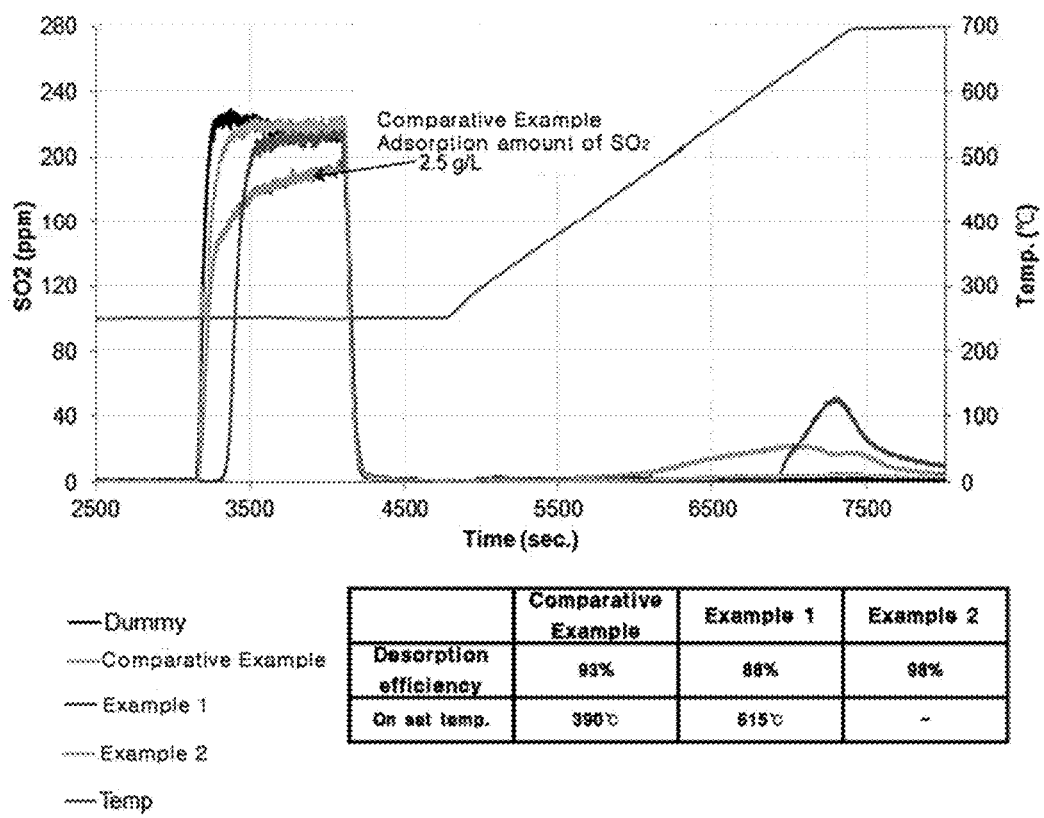

CATALYST COMPOSITION FOR INHIBITING DIESEL ENGINE WHITE SMOKE EMISSION

CROSS-REFERENCE TO RELATED APPLICATIONS

This application is a U.S. National Phase Application of International Application No. PCT/KR2016/012354, filed Oct. 31, 2016, which claims priority to Korean Application No. 10-2015-0171098, filed Dec. 3, 2015, each of which are hereby incorporated by reference in their entirety.

TECHNICAL FIELD

The present invention relates to diesel oxidation catalyst (DOC) and diesel particulate filter (DPF) catalyst compositions which are used in a smoke reduction apparatus in order to prevent white smoke from being generated from a diesel engine. More particularly, the present invention relates to a DOC catalyst enabling minimization of sulfate adsorption, a DPF catalyst that delays sulfate desorption, and a smoke reduction apparatus having the DOC and DPF catalysts assembled therein.

BACKGROUND ART

Diesel engines emit a low amount of hydrocarbons and carbon monoxide, but emit a relatively high amount of nitrogen oxides (NOx) and particulates (smoke). Among diesel exhaust products, smoke is solid or liquid particles contained in the gas generated via combustion or thermal decomposition processes of the engine, and is classified into black smoke, blue smoke, yellow smoke, and white smoke according to the visible floating components thereof. There may be many complex causes of emission of white smoke, and the white smoke includes condensed water, liquid fuel, or sulfide components in the exhaust gas.

The present applicant has disclosed a smoke reduction apparatus for preventing white smoke from being emitted from diesel engines in Korean Patent Application No. 2011-134404 (Dec. 14, 2011). According to this, it was confirmed that, in the smoke reduction apparatus including a diesel oxidation catalyst (DOC) and a diesel particulate filter (DPF) mounted at the rear end of a diesel engine, when the platinum/palladium weight ratio (Pt/Pd) of the diesel oxidation catalyst composition applied to the DOC is larger than 0 and smaller than 1 (0<Pt/Pd<1), the emission of white smoke generated during initial startup of the diesel engine, especially in winter, is significantly reduced.

DISCLOSURE

Technical Problem

Despite the above-mentioned improvement in the reduction of the white smoke emission, there is a need for a catalyst having further improved performance because of the variety of white-smoke-generating factors including the engine and the surrounding environment, and accordingly, a catalyst composition capable of drastically reducing the generation of white smoke has been studied.

Technical Solution

The fundamental cause of the generation of white smoke is the sulfate component adsorbed on the DOC of a smoke reduction apparatus. The adsorbed sulfate is desorbed during a regeneration process of a DPF module and is agglomerated with water particles in the case where a final discharge temperature is 250 to 300° C. or less, thus forming white smoke particles which cause visualization. Accordingly, components capable of preventing the respective steps of this reaction mechanism may be added to the DOC and DPF catalyst components of the smoke reduction apparatus, thereby substantially blocking the generation of white smoke. On the basis of this concept, the present invention provides a smoke reduction apparatus for preventing white smoke from being emitted from a diesel engine. In the smoke reduction apparatus, the noble metal support of a diesel oxidation catalyst composition applied to a DOC includes zeolite, and a white-smoke reduction component selected from among manganese oxide and silver oxide is included in a DPF.

Advantageous Effects

The acidic zeolite of the diesel oxidation catalyst composition according to the present invention prevents the adsorption of sulfate, and the white-smoke reduction component, which is selected from among manganese oxide and silver oxide and which is applied on the DPF, delays the emission of sulfate, whereby it is possible to significantly reduce the emission of white smoke generated during initial startup of the diesel engine, especially in winter.

DESCRIPTION OF DRAWINGS

FIG. 1 is a view obtained by measuring the opacity and the $SO_2$ emission concentration in Example 1 and a Comparative Example;

FIG. 2 is a view obtained by measuring the opacity and the $SO_2$ emission concentration in Example 2 and the Comparative Example; and FIG. 3 is a graph showing the sulfate desorption efficiency in Examples 1 and 2 and the Comparative Example.

BEST MODE

The present inventors have developed catalyst compositions of units constituting a smoke reduction apparatus in an attempt to prevent white smoke from being emitted from a diesel engine. In the present invention, the smoke reduction apparatus means a combination of a diesel oxidation catalyst and a diesel particulate filter (DPF). The diesel oxidation catalyst is an oxidation catalyst including a platinum group metal, a base metal, and a combination thereof, and is a catalyst for converting unburned hydrocarbons (HC), carbon monoxide (CO), and a portion of particulate materials into carbon dioxide and water by oxidizing. The diesel oxidation catalyst is commonly applied on various monolith substrates or carriers for use. The diesel particulate filter that is used is followed by the rear end of the diesel oxidation catalyst. The diesel particulate filter, which is usually embodied as a ceramic substrate filter, is coated with a catalyst component containing a platinum group metal component in order to remove particulate materials and to perform forcible regeneration. The term "platinum group metal" used in the present application is used interchangeably with a noble metal component, and means platinum and palladium. Commercially available DOCs and DPFs include a number of precious metal components including platinum and palladium.

According to various experiments by the present inventors, white smoke is generated based on the following mechanism.

1) The sulfur dioxide emitted from the diesel engine is oxidized to sulfate ($SO_3$) in the DOC:

$$2SO_2+O_2 \rightarrow 2SO_3$$

2) The generated sulfate is adsorbed on the surface of the DOC:

$$SO_3+M \rightarrow M\text{-}SO_3$$

3) The adsorbed sulfate is desorbed to form sulfate and sulfur dioxide during a DPF regeneration process:

$$M\text{-}SO_3 \rightarrow M+xSO_2+ySO_3$$

4) When the discharge temperature is 250 to 300° C. or less, the sulfate is agglomerated with water to thus be emitted in the form of white smoke.

The present inventors have focused on a method for suppressing such a mechanism, particularly a new catalyst composition. Specifically, an acidic material is selected as a DOC catalyst support to thus prevent the adsorption of sulfate, and further, a base material is selected as a DPF coating component to thus delay the desorption of sulfate or minimize adsorption and desorption amounts. The present inventors have confirmed that manganese oxide or silver oxide contained in the DPF coating component has remarkable activity in connection with the sulfate desorption/adsorption phenomenon.

A light-transmitting smoke measurement device applied to the present invention is the same as that disclosed in an application previously filed by the applicant (Patent Application No. 2011-134404), which is incorporated herein by reference in its entirety. The present inventors appropriately selected a support for supporting the noble metal component or an additional component, rather than focusing on the content of noble metal of the DPF catalyst components applied to the smoke reduction apparatus, thereby impeding the progress of a white-smoke generation reaction mechanism so that white smoke is prevented from being generated.

Preparation of DOC and DPF Catalyst Compositions

A catalyst composition applied as a slurry on a DOC substrate (or a carrier) and a DPF filter, which constitute the smoke reduction apparatus, is known in the art, and includes, in general, platinum group metal and base metal substrate compositions. An example of the catalyst composition that may be used in the DOC and the DPF typically contains a platinum group component (for example, a platinum, palladium, or rhodium component) dispersed on a refractory oxide support having a high surface area (for example, γ-alumina). Suitable platinum group metal components are platinum and palladium. The content of the precious metals, which include platinum and palladium and which are loaded on the DOC, is about 20 to 200 g/ft³, and a Pt:Pd weight ratio is about 10:1 to 2:1. In order to obtain appropriate activity in the DPF, Pt is contained alone, or Pd is partially contained therein. When Pd is contained, the Pt/Pd weight ratio is usually 1 or more.

In the present invention, the DOC catalyst component further includes acidic zeolite, and the acidic zeolite may prevent the above-described adsorption reaction of sulfate. Natural or synthetic zeolites may be applied, and a representative example of the zeolites may be beta zeolite (BEA), without limitation thereto. Meanwhile, the DPF catalyst component further includes manganese oxide or silver oxide, and these components serve to delay the desorption of sulfate during a DPF regeneration process, and consequently, the result of a reverse reaction mechanism may be obtained, so that white smoke may be prevented from being generated.

GENERAL EXAMPLE

DOC and DPF catalyst compositions were prepared by adjusting the ratio of platinum and palladium components contained in a DOC and a DPF using methods known in the art. The prepared catalyst compositions were converted into slurry and were applied on a typical carrier for DOC and a DPF filter to assemble the smoke reduction apparatus, and white smoke was measured using a light-transmitting smoke measurement device.

DOC CATALYST COMPOSITION PREPARATION EXAMPLE

Gamma-alumina, chloroplatinic acid, and palladium nitrate were used to prepare Pt—Pd-impregnated alumina including platinum and palladium mixed at a weight ratio of 2:1 therein. A zeolite powder was further added to the slurry obtained by dispersing the Pt—Pd-impregnated alumina in water, followed by ball milling, so that about 90% of the resultant particles had a particle size of 8 to 10 μm. The slurry that was subjected to ball milling was applied on a cordierite honeycomb and dried at 150 to 160° C. for about 10 minutes, followed by calcination at 530 to 550° C. for about minutes, thus completing a Pt—Pd/Al$_2$O$_3$+H-BEA DOC catalyst (total 90 g/ft³, platinum:palladium=2/1). Hereinafter, this will be referred to as 'Example DOC'.

DPF CATALYST COMPOSITION PREPARATION EXAMPLE 1 (SILVER OXIDE DPF)

Silver nitrate, as an Ag precursor, was diluted in an excessive amount of distilled water, impregnated with an obtained CePrO$_2$ (80:20) powder (A), dried at 120° C. for 4 hours, and calcined at 450° C. for 2 hours, thus preparing an Ag/CePrO$_2$ (2.5 wt % Ag/A) complex oxide (also referred to as Ag/OSC). Fe$_2$O$_3$ powder (1.0 wt %) and Al$_2$O$_3$ as a binder were mixed with the complex oxide, followed by impregnation with chloroplatinic acid and palladium nitrate. The mixture powder was dispersed in water to thus form a slurry state. Milling was performed to an average particle size of 7 μm or less. The slurry was carried in a filter including a silicon carbide material using a dipping method, dried at 120° C., and calcined at 450° C. for 1 hour, thus completing a DPF containing silver oxide.

DPF CATALYST COMPOSITION PREPARATION EXAMPLE 2 (MANGANESE OXIDE DPF)

A MnO$_2$ component was dispersed in water to thus form a slurry state, and milling was performed so that about 90% of the slurry had a particle size of 7 μm or less. The milled slurry was carried in a filter including a silicon carbide material using a dipping method, was dried at 120° C. for 15 minutes, and was calcined at 450° C. for 1 hour to thus prepare a collecting filter intermediate.

Thereafter, gamma alumina was impregnated with a platinum solution and a palladium solution, and the powder impregnated with platinum and palladium was dispersed in water to thus form a slurry state. Milling was performed so that about 90% of the entire slurry had a particle size of 7 μm or less. The resultant material was carried in the collecting filter intermediate including MnO$_2$ carried therein in a rearside direction using a dipping method, was dried at 120° C. for 15 minutes, and was calcined at 450° C. for 1 hour to thus complete a DPF containing manganese oxide.

DPF CATALYST COMPOSITION COMPARATIVE EXAMPLE

Gamma alumina was impregnated with a platinum solution and a palladium solution, and the powder impregnated with platinum and palladium was dispersed in water to thus form a slurry state. After zeolite was further added to the prepared slurry, milling was performed so that about 90% of the entire slurry had a particle size of 7 μm or less. The milled slurry was carried in a filter including a silicon carbide material using a dipping method, dried at 120° C. for 15 minutes, and calcined at 450° C. for 1 hour to thus prepare a collecting filter of the Comparative Example.

Table 1 summarizes the elements of the smoke reduction apparatuses including the DOC and DPF assembled therein prepared according to the above-described Examples and Comparative Example.

TABLE 1

|  | DOC | DPF | Note |
|---|---|---|---|
| Comparative Example | Pt—Pd/$Al_2O_3$ + H-Beta (90 g/ft$^3$, 2/1/0) | Pt—Pd/$Al_2O_3$ + H-Beta (20 g/ft$^3$, 2/1/0) |  |
| Example 1 | Pt—Pd/$Al_2O_3$ + H-Beta (90 g/ft$^3$, 2/1/0) | Pt—Pd/($Al_2O_3$ + Ag/OSC + $Fe_2O_3$) (5 g/ft$^3$, 1/1/0) | Ag-DPF |
| Example 2 |  | $MnO_2$ + Pt—Pd/$Al_2O_3$ (5 g/ft$^3$, 1/1/0) | $MnO_2$-DPF |

Smoke reduction experimental conditions: Fuel containing 14 g of sulfur was passed therethrough, an operation was performed for 20 minutes, and the experiment was performed using a vehicle according to a EURO-5 standard. The results are shown in FIGS. 1 to 3.

FIG. 1 is a view obtained by measuring the opacity and the $SO_2$ emission concentration as a temporal function in Example 1 and the Comparative Example. In Example 1 and the Comparative Example, the same DOC was applied, and the DPF catalyst components varied. As can be confirmed from FIG. 1, when the DPF was coated with silver oxide, specifically, Pt—Pd/($Al_2O_3$+Ag/OSC+$Fe_2O_3$) since the measured values were well outside of the range of white smoke, visible white smoke was not generated. Similarly, FIG. 2 is a view obtained by measuring the opacity and the $SO_2$ emission concentration as a temporal function in Example and the Comparative Example. That is, the same DOC component is applied, and the DPF coating component varies, thus containing additional manganese oxide. As can be confirmed from FIG. 2, when the DPF was coated with a manganese oxide composition, specifically, $MnO_2$+Pt—Pd/$Al_2O_3$, since the measured values were far out of the range of white smoke, visible white smoke was not generated. Finally, FIG. 3 compares the emissions of $SO_2$ of Examples 1 and 2 and the Comparative Example. That is, the DPF coating component in the case where the constitutions of the present invention are applied is compared to that of a conventional smoke reduction apparatus. Desorption of $SO_2$ was most significantly delayed in the case of Example 1, and adsorption and desorption amounts of $SO_2$ were the lowest in Example 2, compared to the Comparative Example, whereby white smoke was judged to be decreased.

The invention claimed is:

1. A smoke reduction apparatus for preventing white smoke from being emitted from a diesel engine, which includes a diesel oxidation catalyst (DOC) and a diesel particulate filter (DPF) mounted at a rear end of the diesel engine, the smoke reduction apparatus comprising:
    a diesel particulate filter catalyst composition which is applied to the DPF and which comprises $MnO_2$ and Pt-Pd/$Al_2O_3$.

2. The smoke reduction apparatus of claim 1, wherein a composition applied to the diesel oxidation catalyst (DOC) includes Pt-Pd/$Al_2O_3$ and zeolite.

3. A smoke reduction apparatus for preventing white smoke from being emitted from a diesel engine, which includes a diesel oxidation catalyst (DOC) and a diesel particulate filter (DPF) mounted at a rear end of the diesel engine, the smoke reduction apparatus comprising:
    a diesel particulate filter catalyst composition which is applied to the DPF and which comprises Pt—Pd/($Al_2O_3$+Ag/OSC+$Fe_2O_3$).

4. The smoke reduction apparatus of claim 3, wherein a composition applied to the diesel oxidation catalyst (DOC) includes Pt-Pd/$Al_2O_3$ and zeolite.

* * * * *